United States Patent
Macneille et al.

(10) Patent No.: US 7,720,260 B2
(45) Date of Patent: May 18, 2010

(54) OBJECT DETECTION SYSTEM AND METHOD

(75) Inventors: Perry Macneille, Lathrup Village, MI (US); Gianna Gomez-Levi, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 917 days.

(21) Appl. No.: 11/531,404

(22) Filed: Sep. 13, 2006

(65) Prior Publication Data
US 2008/0063239 A1    Mar. 13, 2008

(51) Int. Cl.
G06K 9/00 (2006.01)
G01B 11/30 (2006.01)
G08G 1/07 (2006.01)

(52) U.S. Cl. .................. 382/103; 356/603; 340/906

(58) Field of Classification Search .......... 382/103, 382/104, 106, 107, 203, 204, 152, 280, 286; 348/128, 131, 132, 135, 169–172; 356/4.01, 356/28, 512, 520, 601, 604, 634, 603, 606, 356/610, 621, 622, 906; 340/906, 907, 910, 340/919, 931; 701/36, 45, 53, 117
See application file for complete search history.

(56) References Cited

U.S. PATENT DOCUMENTS

| 5,243,665 | A | 9/1993 | Maney et al. |
| 5,361,308 | A | 11/1994 | Lee et al. |
| 5,848,188 | A | 12/1998 | Shibata et al. |
| 6,204,754 | B1 * | 3/2001 | Berstis ................. 340/435 |
| 6,285,778 | B1 * | 9/2001 | Nakajima et al. ....... 382/104 |
| 6,404,506 | B1 | 6/2002 | Cheng et al. |
| 6,438,561 | B1 * | 8/2002 | Israni et al. ............ 707/104.1 |
| 6,590,521 | B1 * | 7/2003 | Saka et al. ............. 342/70 |
| 6,614,536 | B1 | 9/2003 | Doemens et al. |
| 6,700,669 | B1 * | 3/2004 | Geng .................... 356/603 |
| 7,116,246 | B2 * | 10/2006 | Winter et al. .......... 340/932.2 |
| 7,356,408 | B2 * | 4/2008 | Tsuchiya et al. ....... 701/211 |
| 2002/0134151 | A1 | 9/2002 | Naruoka et al. |
| 2003/0123707 | A1 | 7/2003 | Park |

FOREIGN PATENT DOCUMENTS

| DE | 102005003191 A1 | 7/2006 |
| EP | 0363735 A2 | 4/1990 |
| EP | 1615051 A1 | 11/2006 |
| EP | 1413850 A2 | 1/2008 |
| JP | 11296783 | 10/1999 |
| WO | 98/16836 | 4/1998 |
| WO | 9958930 A1 | 5/1999 |

OTHER PUBLICATIONS

International Search Report, Dec. 18, 2007, pp. 1-5.

* cited by examiner

Primary Examiner—Abolfazl Tabatabai
(74) Attorney, Agent, or Firm—Jennifer Stee; Brooks Kushman P.C.

(57) ABSTRACT

The embodiments described herein include an object detection system and method for identifying objects within an area. In one embodiment, the objection detection system may formulate an outline of a detected object and generate a three-dimensional shape or image of the object. Object information may be used to determine and communicate the position, range, and bearing of the object.

20 Claims, 6 Drawing Sheets

OBJECT DETECTION SYSTEM AND METHOD

TECHNICAL FIELD

The present invention generally relates to an object detection system for identifying objects within an area.

BACKGROUND OF THE INVENTION

Traffic congestion is identified as a major global problem for motor vehicle transportation. In some cases, congestion costs billions of dollars annually in lost productivity, environmental losses due to urban sprawl, pollution, and infrastructure costs. In response, a number of congestion mitigation systems have been developed to reduce the impact of traffic congestion. Conventional congestion mitigation systems require sensors that are capable of accurate detection and tracking of objects including other vehicles. However, the detection of objects by conventional congestion mitigation systems require relatively expensive processors for computationally intensive data processing. Additionally, traffic congestion detectors are also costly and typically provide insufficient information for adequate congestion mitigation methods.

The embodiments described herein were conceived in view of these and other disadvantages of conventional object detection systems.

SUMMARY OF THE INVENTION

The embodiments described herein provide an object detection system and method for identifying objects within an area. The object detection system includes a pattern projector for projecting a light pattern on the area wherein the light pattern is distorted and/or reflected by the object within the area. An image capturing device is communicative with the pattern projector and is configured to capture a first image of the light pattern that is distorted and/or reflected by the object. A processor is included which processes the image of the distorted and/or reflected light pattern and provides an outline of the object based on the processed image having the distorted and/or reflected light pattern.

The method for identifying an object in an area includes projecting a light pattern on the area, through the use of a pattern projector. Accordingly, the light pattern may be distorted and/or reflected by the object within the area. The method also includes capturing a first image of the light pattern that is distorted and/or reflected by the object through the use of an image capturing device that is communicative with the pattern projector. The method further includes processing the image of the distorted and/or reflected light pattern and configuring an outline of the object based on the processed image.

BRIEF DESCRIPTION OF THE DRAWINGS

The features of the present invention which are believed to be novel are set forth with particularity in the appended claims. The present invention, both as to its organization and manner of operation, together with further advantages thereof, may be best understood with reference to the following description, taken in connection with the accompanying drawings in which:

DETAILED DESCRIPTION OF THE EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

Figure 1:
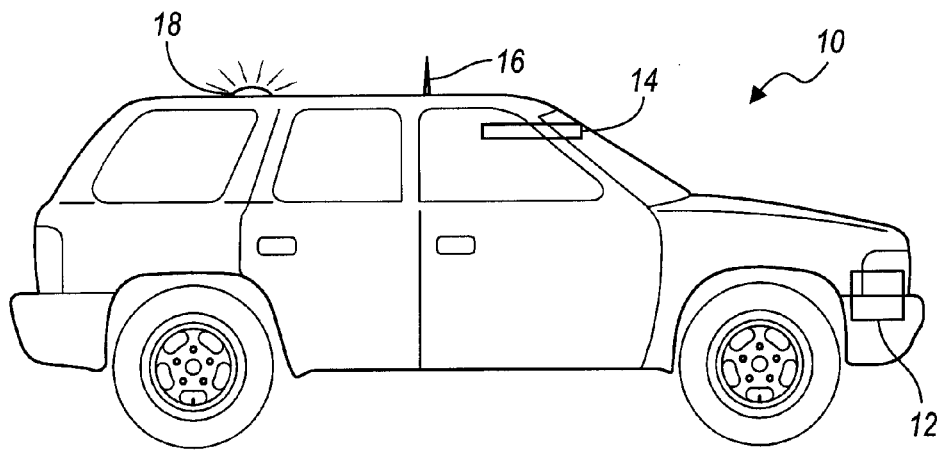
FIG. 1 illustrates a vehicle having an object detection system in accordance with an embodiment of the present invention.

Now, referring to FIG. 1, a vehicle 10 is shown having an object detection system in accordance with a preferred embodiment. Vehicle 10 includes a pattern projector 12, an image capturing device 14, a radio system 16, and a global navigation system (GNS) 18. Vehicle 10 is capable of detecting objects (e.g., vehicles) in an area and communicating data related to the detected objects to a vehicle operator, other vehicles, traveler information system, and the like. As will be described hereinafter, the object detection system on vehicle 10 may be embodied in stationary roadside devices. In either embodiment, the object detection system provides an efficient method for rendering an area containing vehicles and roadside objects in three dimensions.

Figure 2:
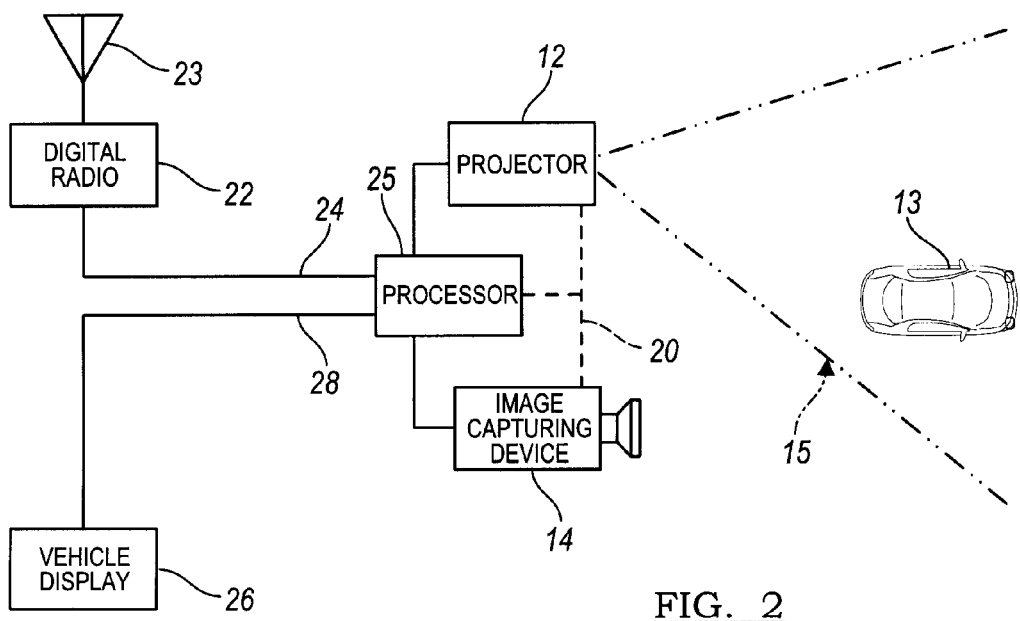
FIG. 2 illustrates a schematic diagram of the object detection system illustrated in FIG. 1.

Referring to FIG. 2, a schematic diagram of the object detection system as shown in FIG. 1 is provided. Pattern projector 12 illuminates an area with a light pattern 15 wherein the area may contain one or more objects 13. Once light pattern 15 illuminates the area containing object 13, light pattern 15 may be distorted and/or reflected by object 13. This distortion and/or reflection causes discontinuities in the light pattern 15. Accordingly, image capturing device 14 captures an image of the area containing the light pattern including the discontinuities.

The images captured by image capturing device 14 are processed by a processor 25. As illustrated, a data line 20 also couples processor 25 to pattern projector 12 and image capturing device 14. As such, processor 25 is capable of controlling and synchronizing the operations of pattern projector 12 and image capturing device 14. Data from image capturing device 14 is processed by processor 25 and information pertaining to the position, speed and bearing of the object 13 may be obtained. This information may also be transmitted via a data line 28 and displayed by a vehicle display 26. Additionally, processor 25 may transmit data to radio 22 via data line 24. Accordingly, through the use of an antenna 23, the processed data may be transmitted to other devices/systems including a traveler information system (not shown). The traveler information system may then forward related information to other vehicles to inform vehicle operators of travel conditions (e.g., traffic congestion) in the area. As shown in FIG. 1, GNS 18 may be included for providing the position and velocity of vehicle 10 to a traveler information system and/or the vehicle operator. It is recognized that GNS 18 includes, but is not limited to, global position systems, satellite navigation systems and the like without departing from the scope of the present invention.

Processor 25 may be virtually any type of processor capable of storing, retrieving and processing data. Based on information received from image capturing device 14, processor 25 is capable of generating an outline of object 13 based on images received from image capturing device 14. Based on the outline, a three-dimensional shape or image of object 13 may be configured.

Preferably, processor 25 contains a plurality of object models. The object outlines generated by processor 25 may be matched with the object models to form the three-dimensional image of object 13. Once a three-dimensional image is configured, it may be transmitted to radio 22 and display 26 for receipt by a traveler information system vehicle operators, and/or other vehicles. In this manner, objects within a designated area may be classified and tracked utilizing the three-dimensional models, bearing and range.

Figure 3:
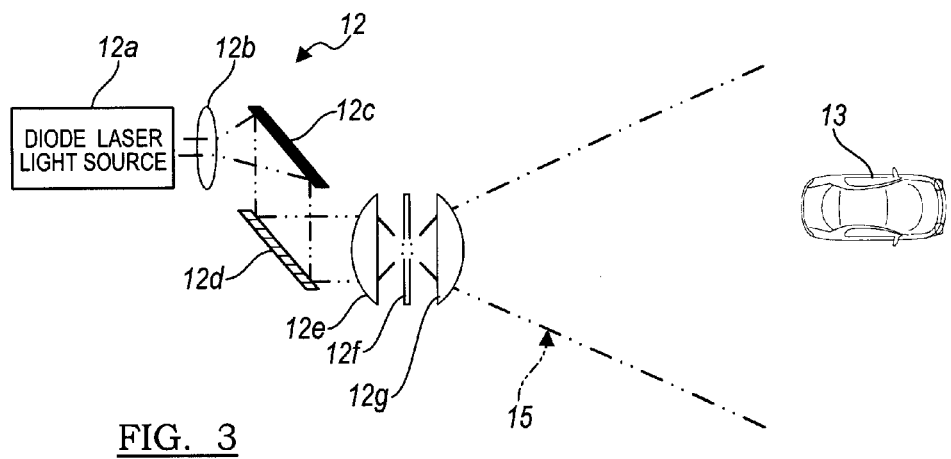
FIG. 3 illustrates a detailed illustration of a pattern projection device in accordance with an embodiment of the present invention.

Referring to FIG. 3, a detailed diagram of an exemplary pattern projector 12 is provided. In the present invention, virtually any pattern projection device may be utilized as an illuminating source. However, it is preferred that a pattern projector having large depth of field and pure color be implemented. Accordingly, in one embodiment, a grating (PRM) light valve (GLV) pattern projector may be employed. GLV projectors typically have high depth of field and do not require mechanical focusing lenses. As such, objects (i.e., objects 13) both near and far are in focus absent mechanical focusing devices.

In the embodiment shown in FIG. 3, an infrared diode laser may be a light source 12*a* for the pattern projector. Preferably, but not necessarily, the diode laser is tuned to the near infrared spectrum in a range of 705 nanometers to 1200 nanometers with a bandwidth of 10 nanometers. A spreading lens 12*b* guides the light emitted from light source 12*a* onto a mirror 12*c*. Mirror 12*c* redirects the emitted light onto a GLV 12*d*. A fourier transform lens 12*e* redirects the light through a fourier transform filter 12*f* and an inverse fourier transform lens 12*g*. Light emitted from inverse Fourier Transform Lens 12*g* is preferably, although not necessarily, emitted in a fan pattern as indicated by light pattern 15.

The GLV embodiment of the pattern projector is one of a class of optical devices referred to as spatial light modulators. However, it is recognized that other spatial light modulators may be implemented including, but not limited to, acousto-optical, liquid crystal and digital micro-mirror devices (DMD).

Figure 4:
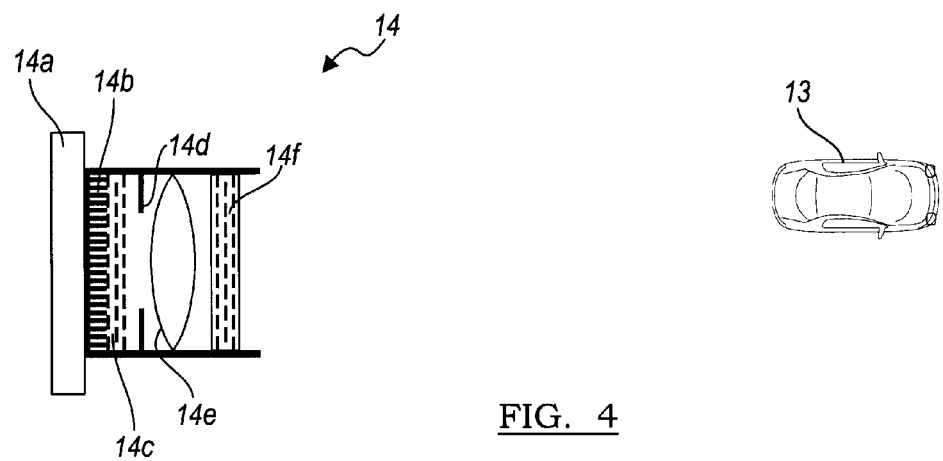
FIG. 4 is a detailed illustration of an image capturing device in accordance with an embodiment of the present invention.

Now, referring to FIG. 4, a detailed illustration of image capturing device 14 is provided. As described in the foregoing, image capturing device 14 is configured to capture images of the light pattern projected by pattern projector 12. Accordingly, image capturing device may be digital camera. In a preferred embodiment, the image capturing device 14 may be a complimentary metal oxide semi-conductor (CMOS) photo detector that combines local image processing with the photo detection function. Additionally, image capturing device 14 may have image subtraction functionality. For example, in some instances, image capturing device 14 may capture an image of an area prior to the projection of a light pattern by the pattern projector. In such a case, the image captured causes undesirable noise when a subsequent image is captured in conjunction with the projection of a light pattern by the pattern projector. Thus, image capturing device 14 subtracts the previous image (i.e., the image captured while the photo detector is not operating) from the image taken in conjunction with the projection of the light pattern. Additionally, image capturing device 14 may divide the image into monochrome bands so as to remove undesirable noise, such as ambient light. Device 14 may also reduce the image size thereby minimizing the amount of processor memory needed for processing of the captured images.

As shown in FIG. 4, image capturing device includes a back plate 14*a* and an imaging sensor 14*b*, which may be a silicon-based imaging sensor. Preferably, back plate 14*a* provides structural support for image capturing device 14. A shutter 14*c* and an aperture 14*d* reduce noise in image capturing device 14 by scaling light emitted from light source 12(*a*) (FIG. 3). An infinite focus lens 14*e* operate to focus the distorted and/or reflected light by limiting the field of view of image capturing device 14. These devices also control the amount of light focused on imaging sensor 14*b*. A filter 14*f* may be included, which may be a band pass filter. In one embodiment, the normal band width of color filter 14*f* may be ten nanometers. Through the use of the above devices, image capturing device 14 is capable of controlling light levels to avoid over and under exposure of images.

Figure 5:
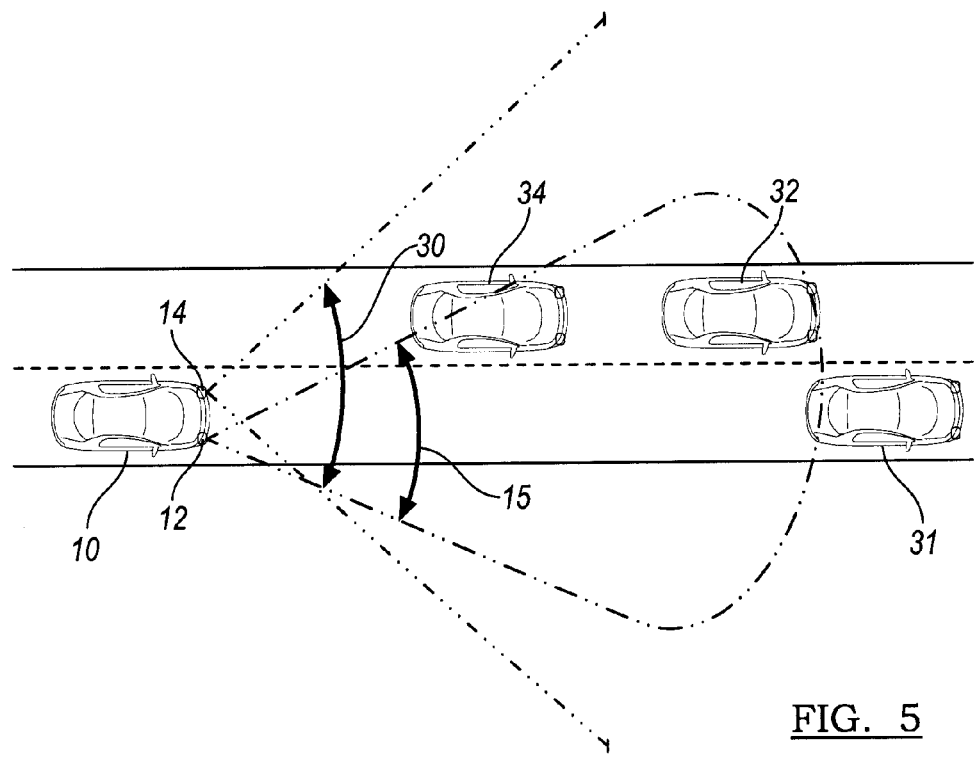
FIG. 5 is an exemplary illustration of a vehicle having an object detection system in accordance with an embodiment of the present invention.

Referring to FIG. 5, an object detection system is shown on vehicle 10, wherein objects 31, 32, and 34 are being detected. FIG. 5 also illustrates various patterns emitted by pattern projector 12 and image capturing device 14. As shown, light pattern 15 emitted by pattern projector 12 reaches multiple objects including objects 31, 32, and 34. Additionally, image capturing device 14 has a field of view 30 that is larger than the width of light pattern 15. As such, image capturing device 14 may capture images of objects 31, 32, and 34. Based on the captured images, the processor may determine the range and bearing of objects 31, 32 and 34. The navigation system (FIG. 1) of vehicle 10 may then determine the positions of objects 31, 32 and 34 based on their range and bearing from vehicle 10. As described in the foregoing, this position, velocity and directional information may be transmitted to a traveler information system, vehicle occupants, and/or other vehicles.

Figure 6:
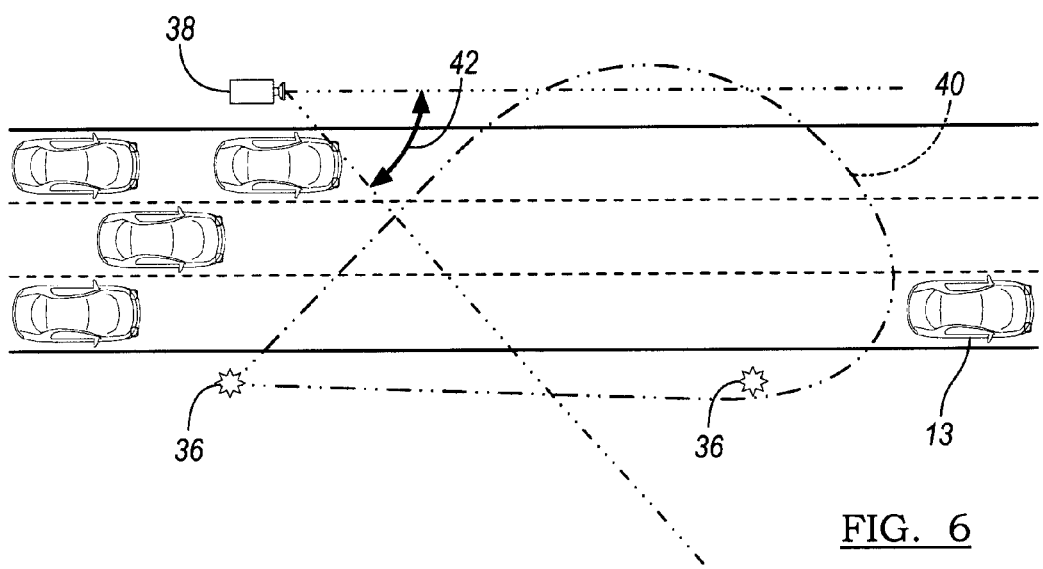
FIG. 6 illustrates an alternative embodiment of an object detection system in accordance with an embodiment of the present invention.

Now, referring to FIG. 6, an alternative embodiment of an object detection system is shown. Particularly, an image capturing device 38 and a pattern projector 36 are embodied as roadside devices. In such an embodiment, image capturing device 38 and pattern projector 36 may communicate via wireless communication protocols including, but not limited to, bluetooth or wi-fi. As described with respect to previous embodiments, image capturing device 38 has a field of view 42 that captures object(s) 13 as illuminated by a light pattern 40. In this embodiment, image capturing device 38 may be located on one side of a road while the pattern projector 36 is located on a second side. It is recognized, however, that in other embodiments image capturing device 38 and pattern projector 36 may be located on a single side of a road or packaged as a unitary device.

Figure 7:
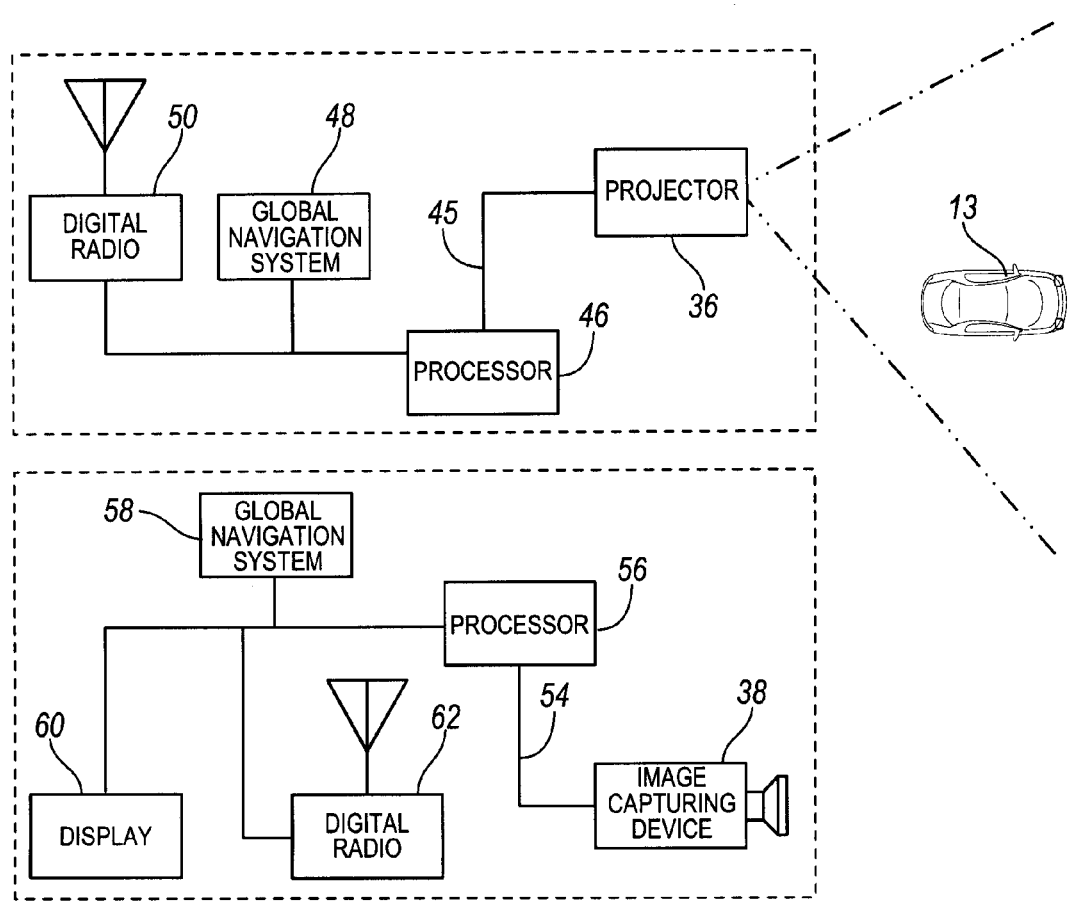
FIG. 7 illustrates a detailed schematic diagram of the object detection system illustrated in FIG. 6.

FIG. 7 provides a detailed illustration of the object detection system of FIG. 6. In this embodiment, the roadside pattern projector 36 may be packaged with a processor 46 that receives signals from projector 36 via a data line 45. A GNS 48 and a digital radio 50 may also communicate with processor 46 and be packaged with projector 36. Through the use of digital radio 50, information pertaining to detected objects may be transmitted to image capturing device 38.

The signals received by image capturing device 38 may be initially received by a digital radio 62. Nevertheless, image capturing device 38 may transmit data related to the captured images to a processor 56 via a data line 54. Processor 56 processes the images received and transmits related information to GNS 58, a digital radio 62 and an optional display 60. As described in the foregoing, the processed information may be received by a traveler information system, vehicle occupants, and/or other vehicles. Furthermore, the object detection system as illustrated in FIG. 7 is capable of detecting objects in an area and communicating such information in a three dimensional format.

Figure 8:
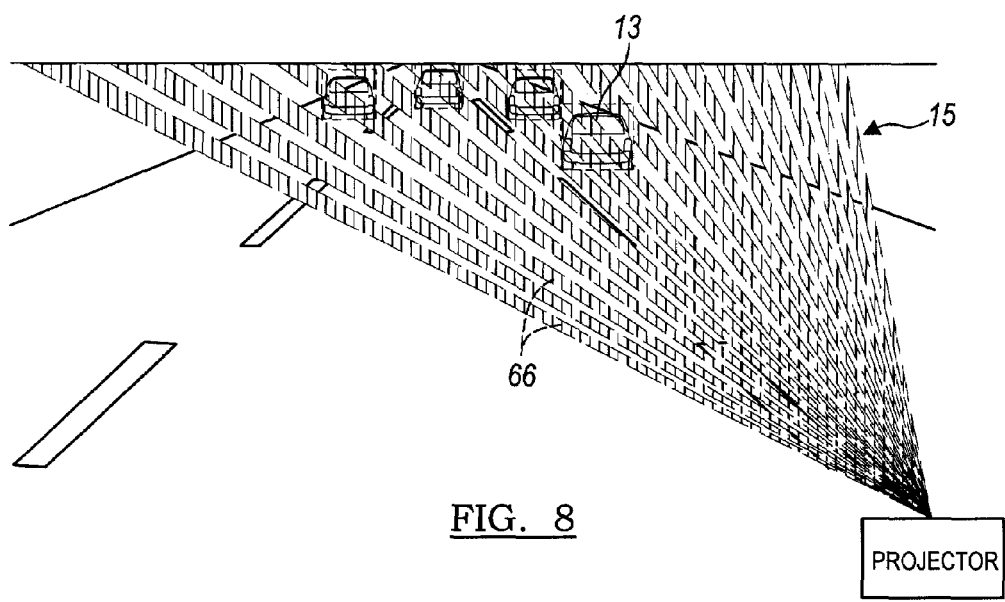
FIG. 8 illustrates a light pattern in accordance with an embodiment of the present invention.
Figure 9:
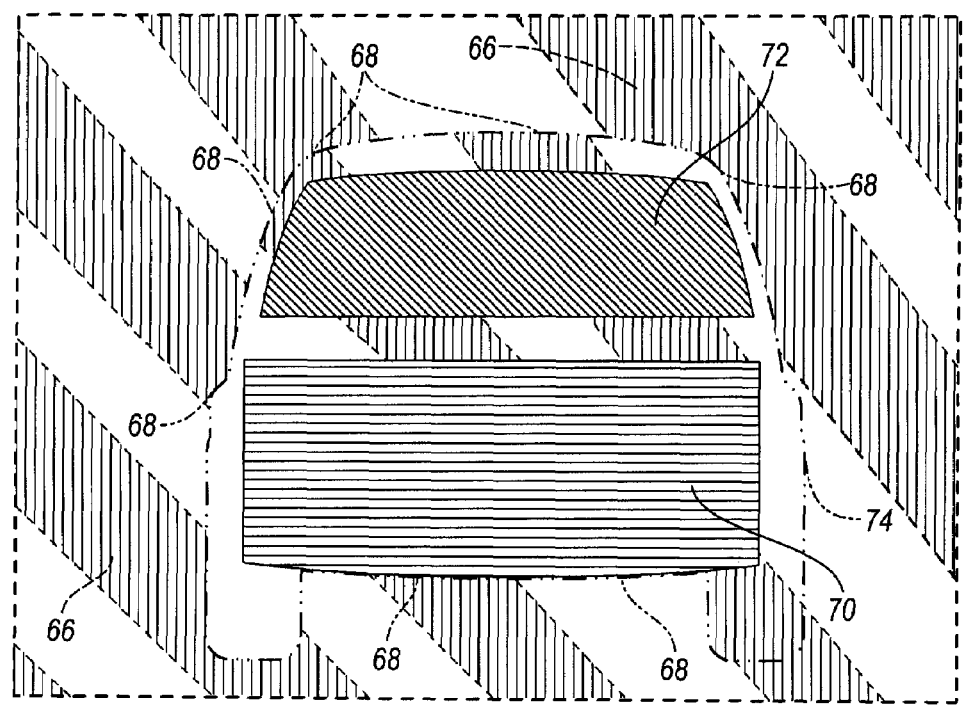
FIG. 9 illustrates an exploded view of a light pattern in accordance with an embodiment of the present invention.

Referring to FIG. 8, a light pattern 15 is illustrated in accordance with an embodiment of the present invention. In this embodiment, light pattern 15 has a fan pattern with multiple pattern stripes 66. Pattern stripes 66 are distorted and/or reflected by object 13. Typically, the image capturing device is adapted to recognize the pattern stripes in the area in which object(s) 13 is located. In FIG. 9, an exploded view of vehicle 13 (FIG. 8) is shown. As shown, a number of discontinuities 68 in the pattern stripes mark the edge of the vehicle. This edge defines an object outline 74. Accordingly, the processor is adapted to process the images taken of pattern stripe 66 including discontinuities 68. Additionally, an incline surface 72 and a vertical surface 70 may be captured by the image capturing device.

Outline 74 may then be processed by the processor and matched with a corresponding object model from which a three dimensional shape of the object may be generated. As described in the foregoing, the three dimensional shape may be communicated to other devices. Furthermore, the orientation of the pattern stripes 66 may enable the processor to determine the orientation of the object. As shown in FIG. 9, the pattern stripes 66 have a diagonal orientation. However, pattern stripes 66 may have a vertical orientation or a horizontal orientation. In some embodiments, pattern stripes 66 may have any combination of a vertical, horizontal, and diagonal orientations. Additionally, the width of pattern stripes 66 may be utilized by the processor to determine a range of the object. It is also recognized, that the light pattern may be shifted in a variety of directions such that successive images taken by the image capturing device may be processed to enhance the outline of the vehicle.

Figure 10:
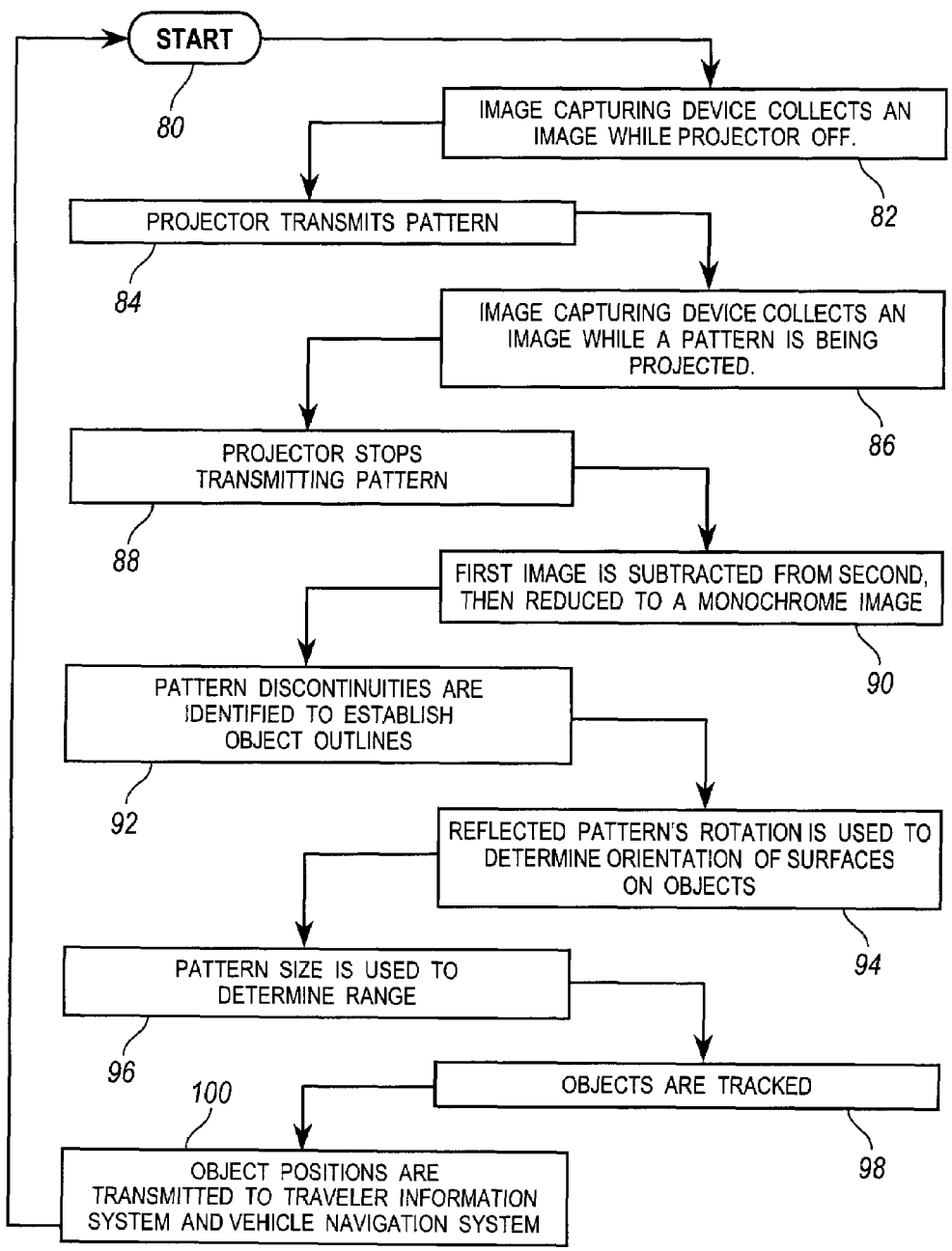
FIG. 10 illustrates a method for detecting objects in accordance with an embodiment of the present invention.

Now, referring to FIG. 10, a flow chart is illustrated that provides a method for identifying objects. A step 80 is an entry point into the method. As shown in block 82, the image capturing device may capture or collect an image prior to activation of the projector. As depicted by block 84, the projector is activated and transmits a light pattern. Block 86 depicts the image capturing device collecting an image while the light pattern is being projected. Accordingly, as shown at block 88, the projector stops transmitting the pattern.

Block 90 depicts, the removal of undesirable noise as a result of images captured at block 82. Particularly, the image captured at block 82 may be subtracted from the image captured at block 86. As also shown in block 90, this second image is reduced to a monochrome image. It is recognized that in some instances, the image capturing device may not collect an image while the projector is off as depicted by block 82. Accordingly, a block 90 may not be necessary in that block 82 may not occur.

As depicted by block 92, the processor identifies pattern discontinuities and establishes an object outline. As described above, a three-dimensional shape of the object may be generated based on the object outline. Block 94 depicts the orientation of surfaces being determined by the rotation of reflected patterns. Block 96 illustrates an object range determination based on the size of pattern stripes within the light pattern. As such, the objects are tracked as depicted by block 98. Accordingly, as shown in block 100, the object positions are transmitted to a traveling information system and a vehicle navigation system. Alternatively, object information may be transmitted to virtually any device or entity without departing from the scope of the present invention. The method then returns to block 80.

While the best mode for carrying out the invention has been described in detail, those familiar with the art to which this invention relates will recognize various alternative designs and embodiments for practicing the invention as defined by the following claims.

What is claimed:

1. An object detection system for identifying an object within an area, the system comprising:
    a pattern projector for projecting a light pattern on the area, wherein the light pattern is distorted and/or reflected by the object within the area;
    an image capturing device that is communicative with the pattern projector, the image capturing device being configured to capture a first image of the light pattern that is distorted and/or reflected by the object; and
    a processor being communicative with the image capturing device wherein the processor processes the image of the distorted and/or reflected light pattern, the processor configuring an outline of the object based on the processed image having the distorted and/or reflected light pattern, the processor including a memory having at least one object model, the processor being adapted to select a first object model based on the outline of the object to form a three-dimensional shape of the object.

2. The system of claim 1, wherein the pattern projector includes a grating light (GLV) for generating the light pattern.

3. The system of claim 1, wherein the light pattern includes a fan pattern having multiple pattern stripes.

4. The system of claim 3, wherein the processor determines an orientation of the object based on an orientation of the pattern stripes.

5. The system of claim 3, wherein the processor determines a range of the object based on the width of the pattern stripes.

6. The system of claim 1, further comprising a display that is coupled to the processor for displaying data relating to the processed image.

7. The system of claim 1, wherein the image capturing device subtracts a previous image captured absent the light pattern from the first image to remove noise from the first image.

8. The system of claim 1, wherein the pattern projector includes an infrared laser diode.

9. The system of claim 1, further comprising a vehicle having the pattern projector, the image capturing device, and the processor mounted thereon.

10. The system of claim 1, wherein the vehicle includes a global navigation system being communicative with the processor for determining at least one of a position, a speed, and a direction of the vehicle.

11. The system of claim 10, further comprising a transmitter coupled to the processor that transmits the position, speed and direction information and data relating to the processed image to at least one of a traveler information system and another vehicle.

12. A method for identifying an object within an area, the method comprising:
    projecting a light pattern on the area, through the use of a pattern projector, wherein the light pattern is distorted and/or reflected by the object within the area;
    capturing a first image of the light pattern that is distorted and/or reflected by the object through the use of an image capturing device that is communicative with the pattern projector;
    processing the image of the distorted and/or reflected light pattern;
    configuring an outline of the object based on the processed image; and
    selecting a first object model from memory based on the outline of the object to form a three-dimensional shape of the object.

13. The method of claim 12, wherein the pattern projector includes a grating light (GLV) for generating the light pattern.

14. The method of claim 12, wherein the light pattern includes a fan pattern having multiple pattern stripes.

15. The method of claim 14, wherein the processor determines an orientation of the object based on an orientation of the pattern stripes.

16. The method of claim 14, wherein the processor determines a range of the object based on the width of the pattern stripes.

17. The method of claim 12, further comprising displaying data relating to the processed image via a display that is communicative with the processor.

18. The method of claim 12, further comprising:
    subtracting a previous image captured absent the light pattern from the first image to remove noise from the first image.

19. The method of claim 12, further comprising:
    mounting the pattern projector, the image capturing device, and the processor on a vehicle; and
    determining at least one of a position, a speed, and a direction of the vehicle via a global navigation system connected to the vehicle.

20. The method of claim 19, further comprising:
    transmitting the position, speed and direction information and data relating to the processed image to at least one of a traveler information system and another vehicle.

* * * * *